Figure 1:
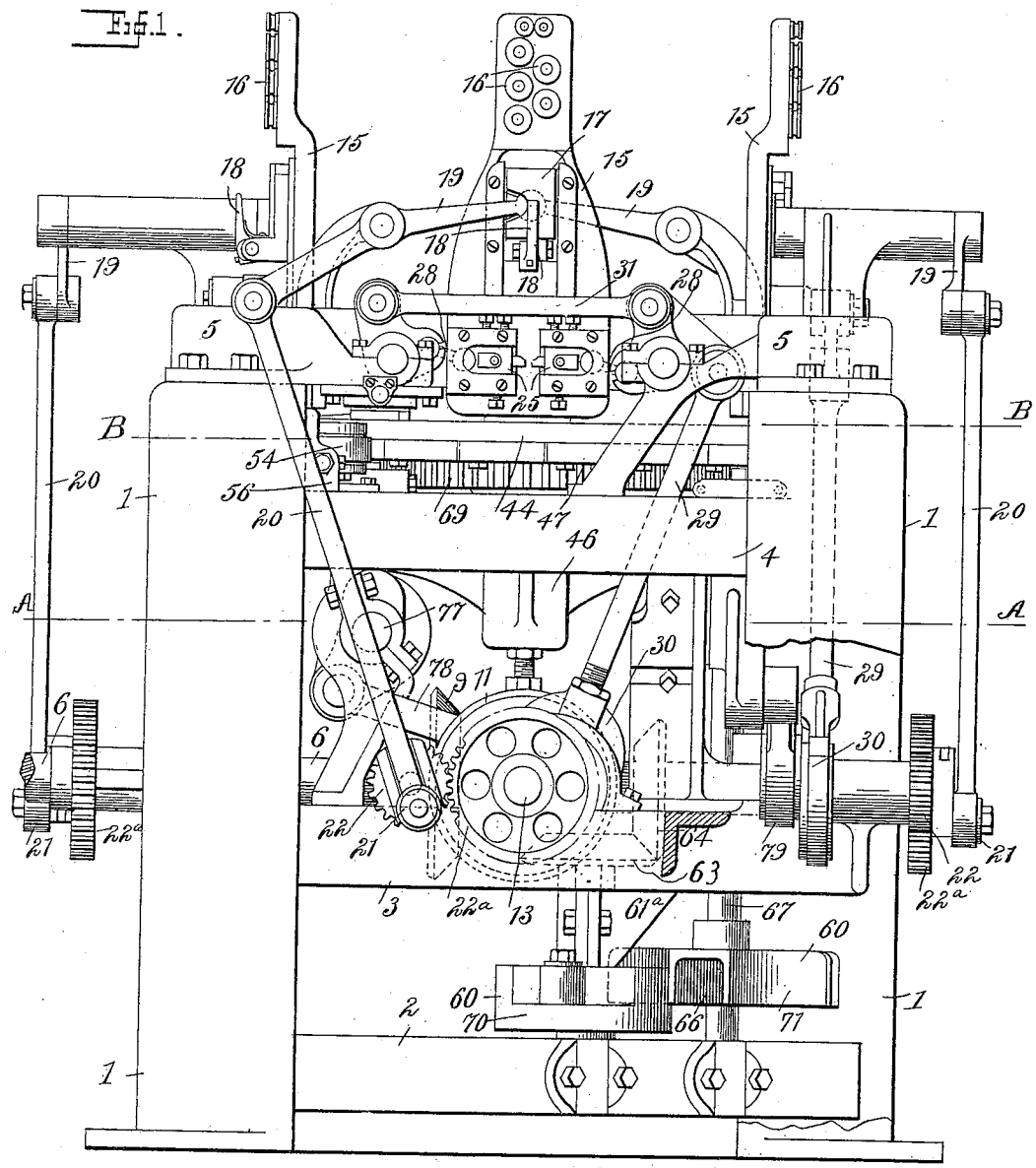

No. 654,048. Patented July 17, 1900.
J. ATKINS.
NAIL MACHINE.
(Application filed Jan. 23, 1900.)

(No Model.) 9 Sheets—Sheet 1.

No. 654,048. Patented July 17, 1900.
J. ATKINS.
NAIL MACHINE.
(Application filed Jan. 23, 1900.)

(No Model.) 9 Sheets—Sheet 2.

Witnesses. Inventor.

No. 654,048. Patented July 17, 1900.
J. ATKINS.
NAIL MACHINE.
(Application filed Jan. 23, 1900.)

(No Model.) 9 Sheets—Sheet 4.

Witnesses.
H. P. Hammond
J. Green

Inventor
James Atkins
by
King & Bros
Attys

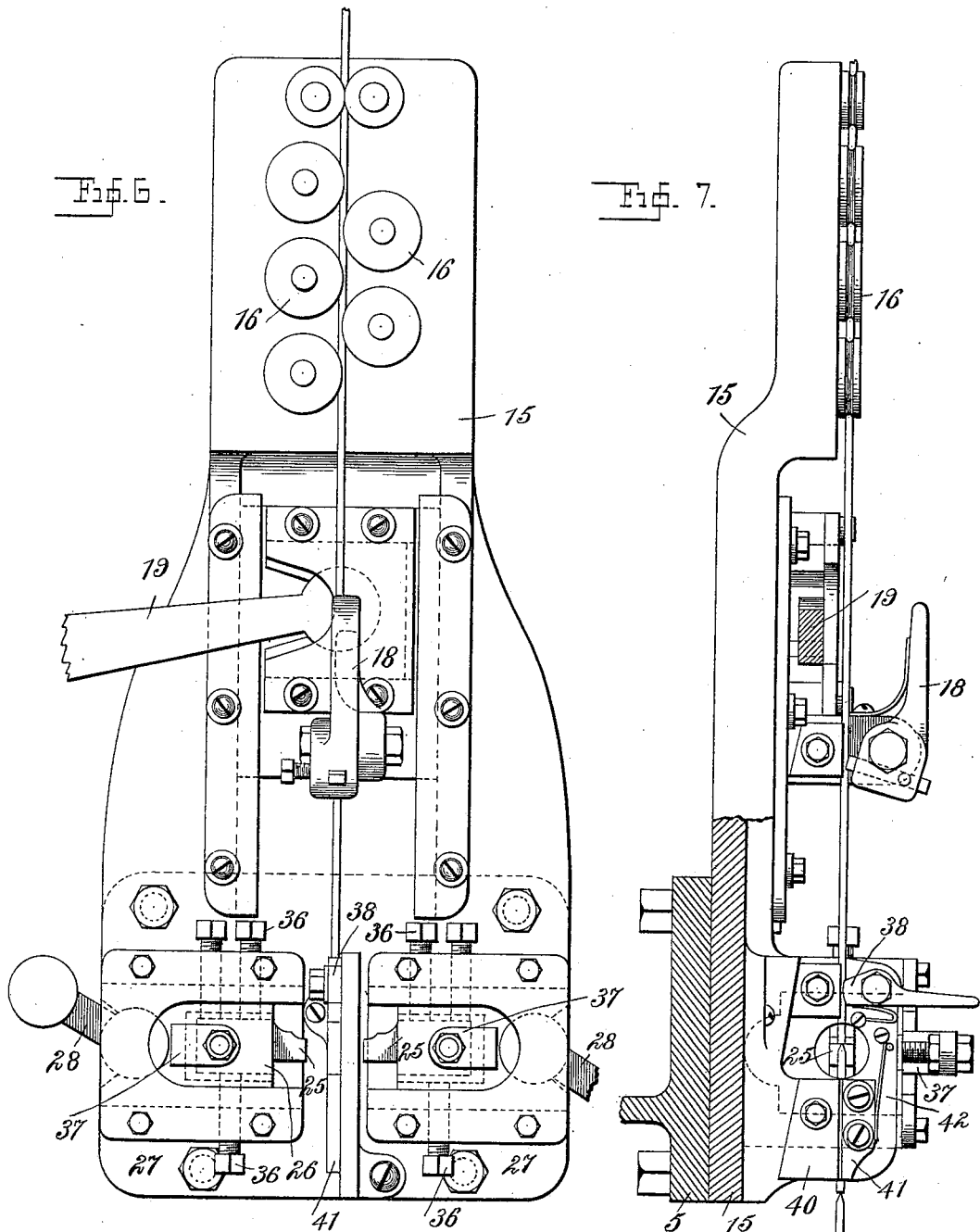

No. 654,048. Patented July 17, 1900.
J. ATKINS.
NAIL MACHINE.
(Application filed Jan. 23, 1900.)
(No Model.) 9 Sheets—Sheet 6.
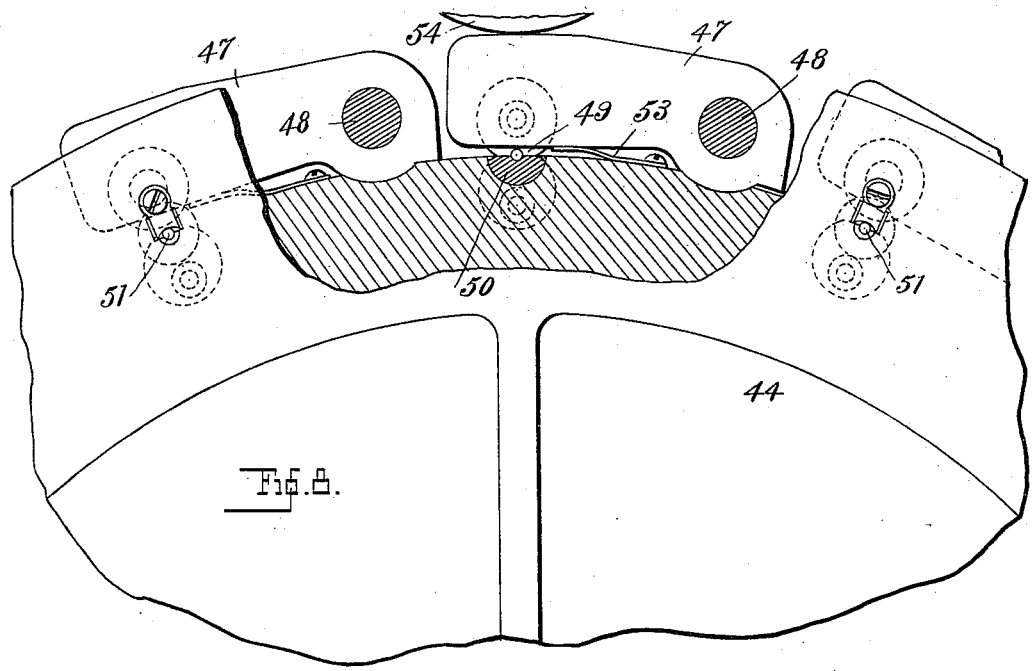
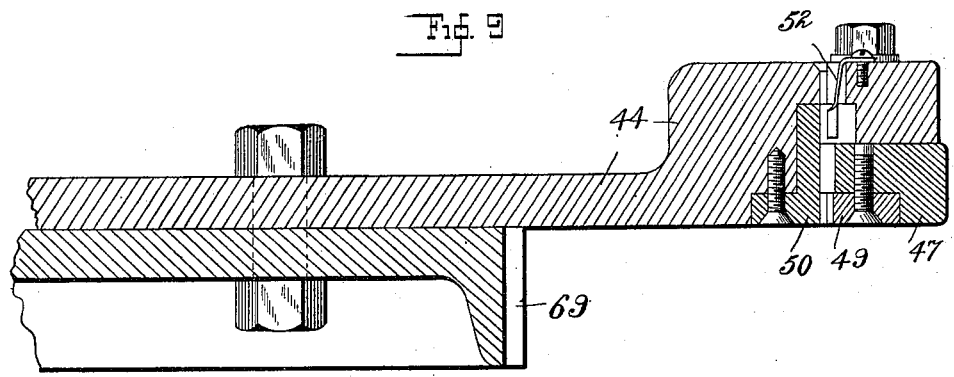
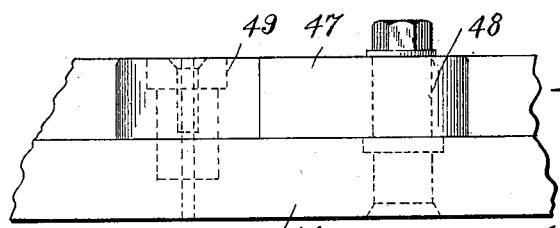
Witnesses. Inventor.

No. 654,048. Patented July 17, 1900.
J. ATKINS.
NAIL MACHINE.
(Application filed Jan. 23, 1900.)
(No Model.) 9 Sheets—Sheet 7.
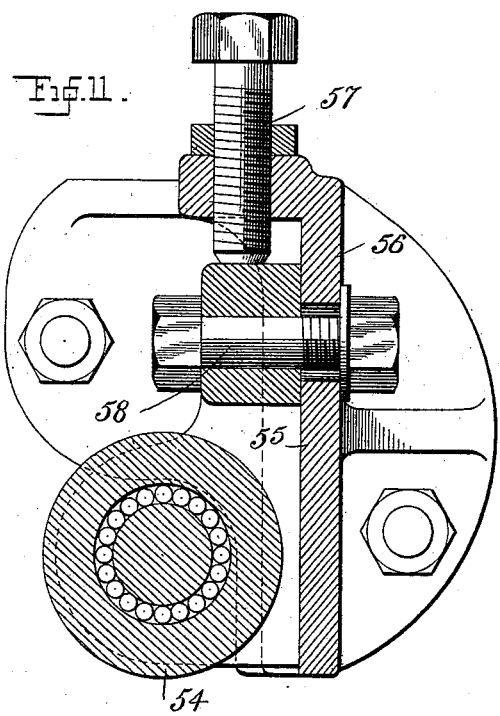
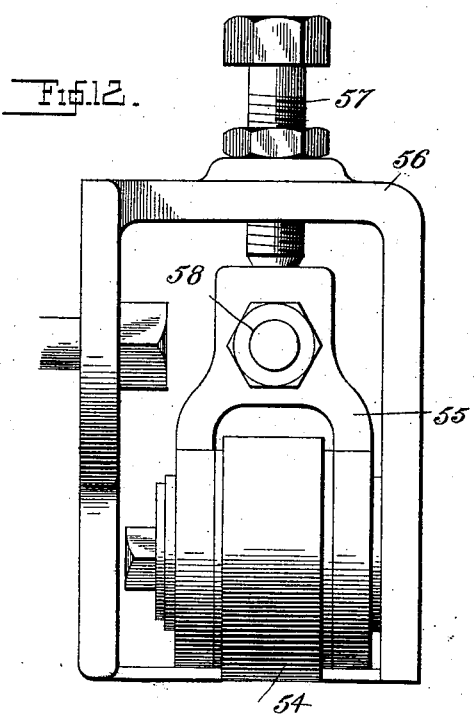
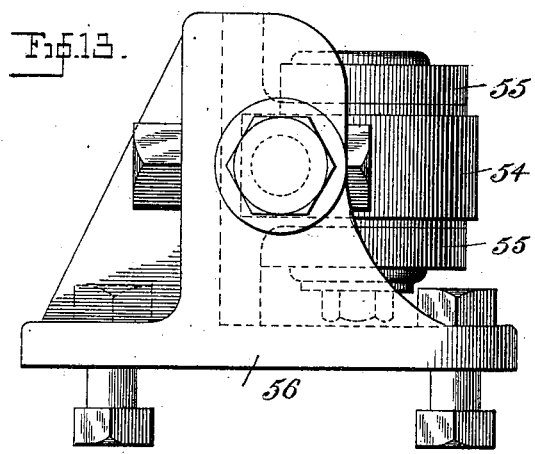
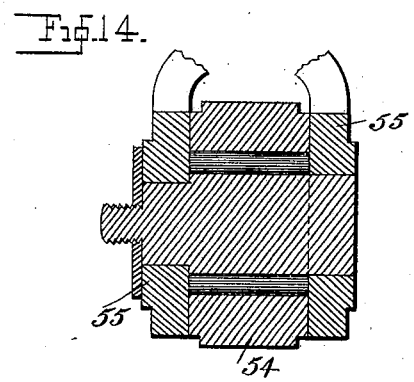
Witnesses.
Inventor.

No. 654,048.                                   Patented July 17, 1900.
J. ATKINS.
NAIL MACHINE.
(Application filed Jan. 23, 1900.)
(No Model.)                                    9 Sheets—Sheet 8.
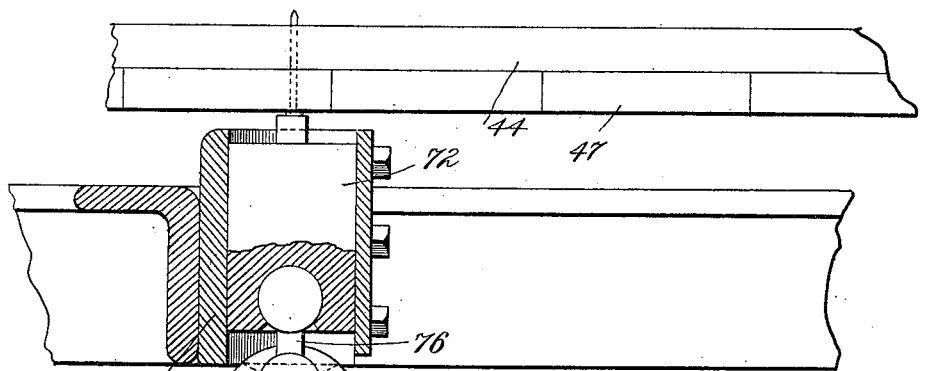
Fig. 15.
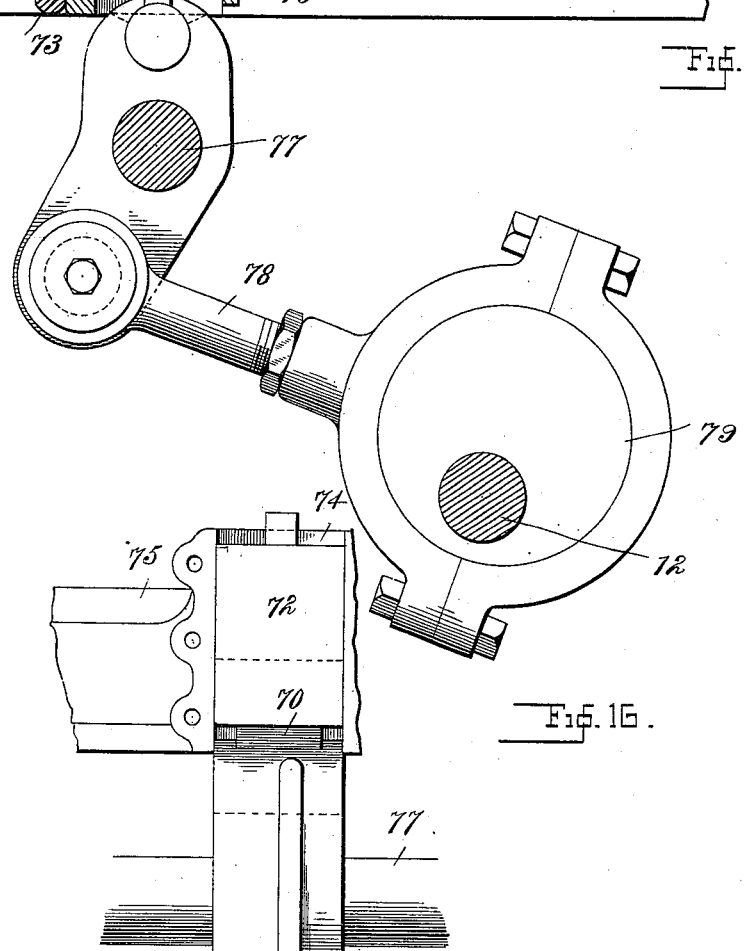
Fig. 16.
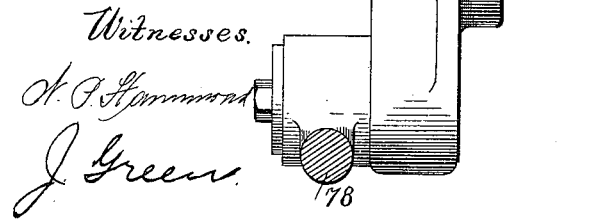
Witnesses.                                     Inventor.

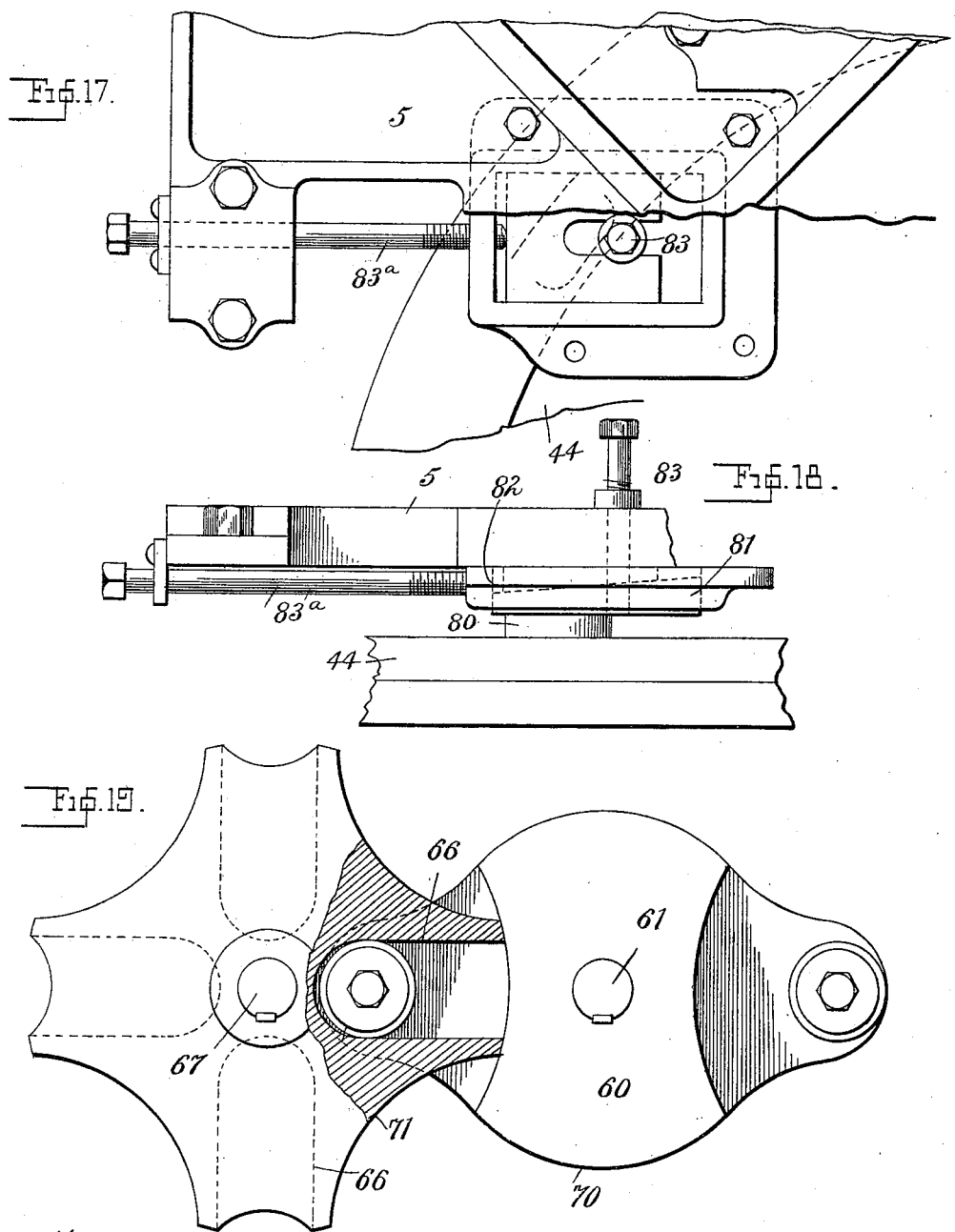

UNITED STATES PATENT OFFICE.

JAMES ATKINS, OF MONTCLAIR, NEW JERSEY.

NAIL-MACHINE.

SPECIFICATION forming part of Letters Patent No. 654,048, dated July 17, 1900.

Application filed January 23, 1900. Serial No. 2,419. (No model.)

*To all whom it may concern:*

Be it known that I, JAMES ATKINS, a citizen of the United States, residing at Montclair, in the county of Essex and State of New Jersey, have invented certain new and useful Improvements in Nail-Machines, of which the following is a specification.

This invention relates to improvements in nail-machines; and its object is to provide a machine adapted to cut, point, and head wire nails in such a manner that the feeding and the heading operations proceed concurrently, thereby effecting an increase in output and also enabling a multiplying effect to be obtained in that a plurality of wires can be formed into nails in a single machine under the direction of a single operator.

My invention comprises, in connection with wire feeding and cutting devices and with a heading device, a carrier which operates intermittently to transfer the cut blank from the cutting device to the heading device, the immediate removal of the blank from the cutting device enabling the feeding and cutting devices to come into immediate operation for feeding and cutting off another blank instead of having to await the heading and release of the nail. The intermittent action of the carrier is of vital importance to the operativeness of the mechanism, in order to effect the necessary pause at the instants of receiving and of heading up the nail-blank, while moving with sufficient rapidity during the times of transfer. One great advantage of a mechanism of this character is its adaptability to the multiplication of the capacity of a nail-machine by the provision of a plurality of sets of feeding, cutting, and heading devices in connection with a single carrier or transfer table. Thus I have found that four of such sets can be conveniently and advantageously arranged in connection with a single carrier or transfer table, and my invention is herein disclosed as embodied in a machine of this nature—that is to say, a machine capable of working on four wires at once, such multiple machine not requiring more floor-space than the ordinary single-acting machine.

I prefer to arrange the machine so as to receive the wires in vertical position, the wires descending vertically from suitable wire-supplying means, such as reels. The feeding in this case is vertical, whereas the cutting, pointing, and transfer movements are horizontal.

Figure 2:
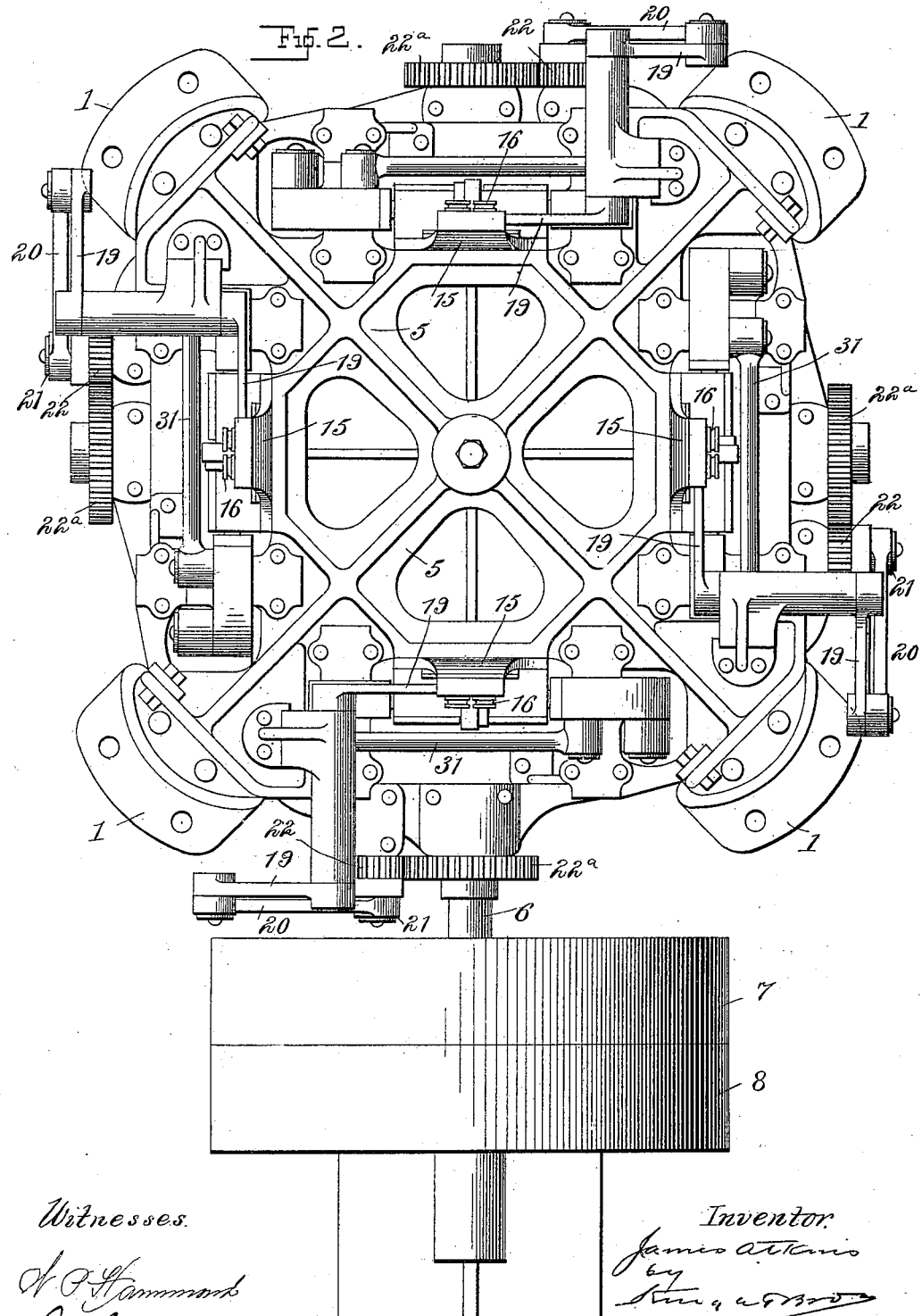
Figure 3:
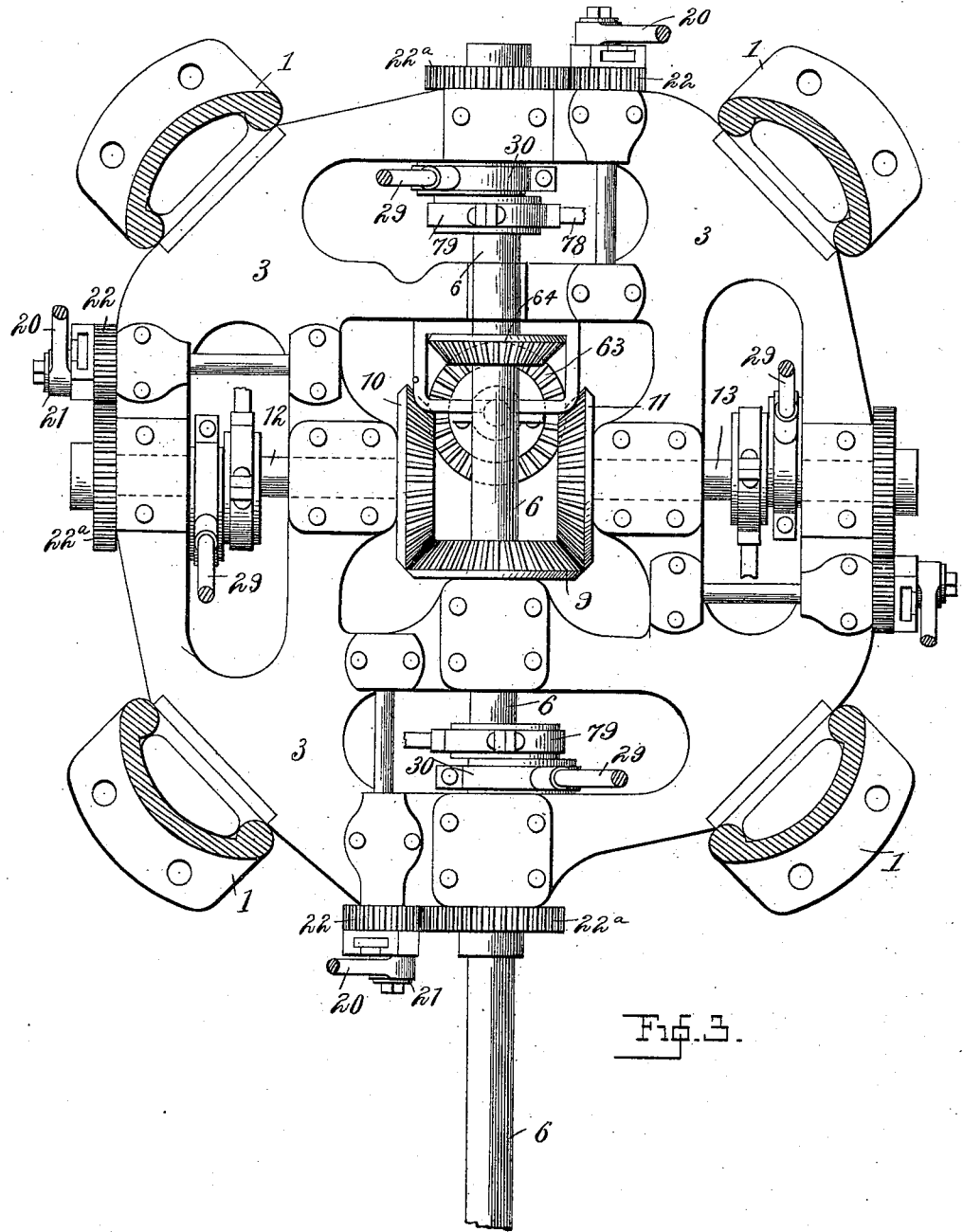
Figure 4:
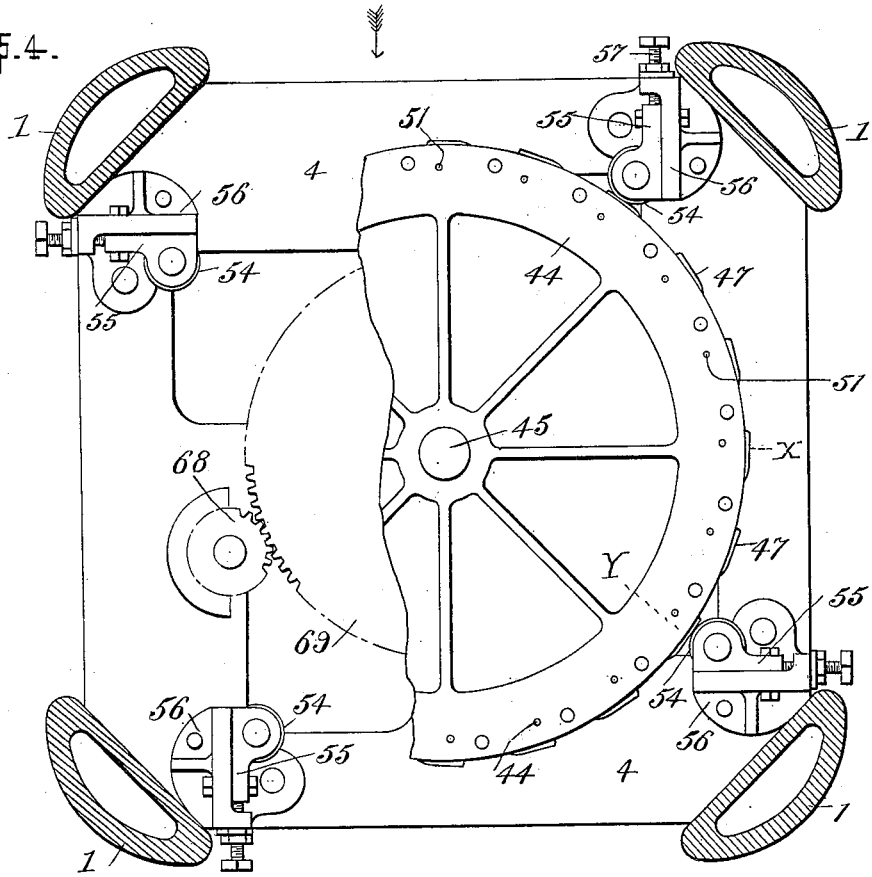
Figure 5:
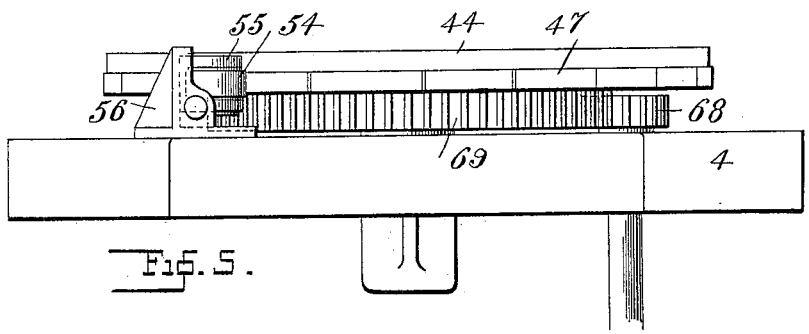

In the accompanying drawings, Figure 1 is a side elevation of a wire-nail machine embodying my invention. Fig. 2 is a plan view of the same. Fig. 3 is a horizontal section on the line A A in Fig. 1. Fig. 4 is a horizontal section on the line B B in Fig. 1. Fig. 5 is a detail side elevation of the mechanism shown in Fig. 4. Fig. 6 is a front elevation of the feed and cut-off mechanism, and Fig. 7 is a side elevation of same with parts broken away. Fig. 8 is a detail plan view of a part of the transfer-table with the nail-clamps. Fig. 9 is a vertical section, and Fig. 10 a side elevation, of the mechanism shown in Fig. 8. Figs. 11 to 14 are detail views of the roller device for operating the clamps on the transfer-table. Figs. 15 and 16 are detail views of the heading mechanism. Figs. 17 and 18 are detail views of an anvil or abutment for the transfer-table. Fig. 19 is a detail plan view of a pin-and-slot wheel-gear for giving an intermittent movement to the transfer-table.

The frame of the machine supporting the various working parts comprises four standards 1 and four horizontal frames or beds 2 3 4 5, supported one above another on said standards. Power is applied to the machine through the shaft 6, which carries for this purpose suitable power-receiving means, such as fast and loose pulleys 7 8, this shaft being journaled on the frame 2 and carrying miter-wheel 9, engaging with miter-wheels 10 11 on shafts 12 13, journaled on the same frame and at right angles to shaft 6. On the respective ends of shaft 6 and on the respective shafts 12 13 are located the four actuating mechanisms for the four sets of nail-forming mechanisms, as hereinafter described.

Referring now to Figs. 1, 6, and 7, there are provided four feed mechanisms, each of which is supplied with wire from a suitable source, the wire being shown as descending vertically to the machine. On four standards or brackets 15 on the top of the machine are arranged straightening-rolls 16 and feeding devices 17, the latter including clutches 18, reciprocated vertically by levers 19, connected at their other ends through links 20 to studs 21 on pinions 22, driven by gears 22ª on the respective shafts 6, 12, and 13. The four wires pass vertically through the respective sets of straightening-rolls and feeding devices and between the jaws of the cutting and pointing devices. The cutting and pointing dies 25 (see Figs. 1, 6, and 7) are in pairs, the dies of each pair being on opposite sides of the wire and carried in die-blocks 26, sliding in guides 27, formed on the face of the bracket 15. These die-blocks receive their motion through toggle-lever connections 28, operated through connecting-rods 29 from eccentrics 30 on the respective shafts 6, 12, and 13, the toggle-lever connections 28 for each pair of die-blocks being joined by a rod 31, so as to operate in unison. The dies 25 may be adjustable along the axis of the wire by means of opposing set-screws 36 and toward the wires by keys 37 or by any effective means. In front of the cutters (see Figs. 6 and 7) is shown an automatic clamp 38, which prevents any retraction of the wire after the forward feeding movement. Back of the cutters (see Figs. 6 and 7) is shown a friction-guide formed by two guide-plates, one of which, 40, is adjustable and bolted to the bracket 15, while the other, 41, is movable and is pressed against the wire by a spring 42. This spring-pressure also serves to hold the blank suspended in the guide until the next feed movement forces it into one of the table-clamps.

Referring now to Figs. 1, 4, 5, 8, and 9, 44 is an intermittently-revolving circular table fixed on a vertical shaft 45, which is supported in suitable bearings 46 in the frames 4 and 5 of the machine. The office of this table is to receive the nail-blanks after they are cut from the wire, carry them to the header, hold them while being upset to form the head, and then remove them from the heading position. For this purpose it carries on its periphery a series of clamps 47, centered on studs 48, fixed in the annular rim of the table, and adapted to be pressed against the blanks and securely hold them while being headed. Each of these clamps carries on its face a hardened-steel die 49, whose complement 50 is fixed in the periphery of the table. (See Figs. 8 and 9.) In line with the center of the dies an opening 51 is formed in the table-rim to allow of the passage of the blank to the dies. Within this opening or passage is a friction-spring 52 or its equivalent, whose office is to hold the blank in proper position longitudinally until it is seized by the clamp and after heading to hold the nail until it is ejected by another entering blank. To reduce wear, the hardened die 50 is extended partly through this passage, as shown. Each clamp 47 is normally kept open by a spring 53. When it reaches the heading position, it is pressed against the blank by means of a clamping-roll 54. After passing the heading position the clamp is opened again by the spring 53 and so remains until it is closed by the next clamping-roll at the next heading position, it being understood that there are four of these clamping-rolls corresponding to the four heading devices. The said clamping-rolls run on roller-bearings and are supported by an adjustable slide 55 on a bracket 56, (see Figs. 11 to 14,) the adjustment being controlled by set-screws 57 58. The table in this instance carries twenty clamps, and at each of its movements a new clamp is brought to each feeding position and a new blank to each heading position. Hence for each forward movement of these devices the table must be moved one-twentieth of a revolution, and between such times of movement of the table the motion of the table must be arrested, so as to permit the operations of inserting the blank in the table and of heading up to proceed. This alternate movement and arrest or intermittent movement of the table is accomplished by a pin-and-slot-wheel movement. (See Figs. 1 and 19.) The pin-wheel 60 is fixed on a shaft 61, which has bearings in a frame 2 and in a fixed bracket 61ª and is driven through its miter-gear 63 from a miter-gear 64 on the main shaft 6. The slot-wheel 65 has four slots 66 and is mounted on a shaft 67, which carries on its upper end a pinion 68, meshing into the table-gear 69, the latter gear being rigidly attached to the table 44. The slot-wheel is moved one-fourth of a revolution by each passage of a pin of the pin-wheel, and there being two pins the slot-wheel receives two impulses for each revolution of the driving-shaft and corresponds in its movements with those of the devices for feeding, cutting, &c., and the gearing to the table is such that the table will move one-twentieth revolution for each slot-wheel movement. The table is held in position during its period of rest by means of the engagement of the central boss 70 of the pin-wheel with the curved faces 71 of the slot-wheel, a feature common to this type of movement. With this power-transmitting device the beginning and ending of the table movements are gradual and without shock. This intermittent movement of the table carries away from each feeding and cutting device the blank which has been inserted in the table by such device, and at the same time it carries other blanks into position opposite the header, and with the construction here shown the complete transfer movement from the feeding device to the heading device is effected in two steps, the first step carrying the blank away from the feeding device and the next step carrying the same blank to the header. This does not interfere with rapid production, as at each step a blank is fed to the header, although it is not the blank which is removed from the feeder at that step, but the one which was removed in the preceding step. This will be understood by referring to Fig. 4, where x indicates the points at which the nail-blanks are fed into the clamps, while *y* indicates the points where the blanks are headed up.

Each of the four heading-dies 72 is carried in a block 73, (see Figs. 15 and 16,) sliding in a guide 74, formed on frame 75, fixed to the frame of the machine. The block receives its motion through the toggle-joint 76, shaft 77, and connecting-rod 78, from an eccentric 79 on shaft 6, 12, or 13, and, like the cutting and feeding movements, it receives two impulses for each revolution of the driving-shaft. This movement of the header upsets the lower projecting end of the nail-blank against the bottom of the clamp-dies and forms the head. The upward pressure of the header is received through the table by an anvil 80, of hardened steel, carried in a frame 81, secured to frame 5. This anvil rests against an adjustable wedge-plate 82 and is held in position by the clamping-screws 83 83ª.

The operations of the four sections of the machine are similar and simultaneous and are as follows, considering the clamps as full of blanks or nails and the feed-slide and header as having finished a forward movement:

First movement: The table advances one division, carrying the headed nail from and bringing a new blank to the header. At the same time a new blank is cut from the wire and lies in the friction-guide between the cutter and the table.

Second movement, (table at rest:) The header heads the blank last presented to it, the blank being held by the clamp closed thereon by the clamp-roll, and the feed advances another length of wire, forcing the blank from the friction-guide into the clamp opposite it and at the same time forcing the finished nail from the clamp.

In every nail-machine heretofore made there are three essential movements in the making of a nail following each other in succession and each requiring its interval of time—viz., heading, feeding, cutting. In the machine here described one of these intervals of time is eliminated—*i. e.*, the heading and feeding are simultaneous, followed by cutting. This, with equal speed of the operating devices, should decrease the time of a given production thirty-three and one-third per cent. or increase the output per unit of time fifty per cent. on each section of my machine. In all other machines also every working part must complete its movement cycle for each nail made, and the rate of production is limited by the number of movements the heaviest parts can make without producing destructive vibrations in the machine. In my machine the parts having the greatest momentum move at only one-half the speed of the ordinary machine for a production equal to that of one section of my machine.

While I have shown my invention as embodied in connection with a rotating transfer-table, it will be understood that the broad principle thereof is applicable by means of an intermittently-traveling transfer device, clamp, or carrier of any kind dependent on the particular construction of the machine to which it is applied.

An important feature of my invention is the location of the several sets of feeding, cutting, and heading devices equidistant or symmetrically around the rotary transfer-table, so that as the headers move simultaneously in a direction parallel to the axis of the table the pressures on the table will all be balanced as regards any tilting or bending movement of the table on its axis, and any strains tending to bend or tilt the table on its axis will be prevented or neutralized. Such bending or tilting strains are far more injurious than direct strains in the line of the shaft.

Having thus described my invention, the following is what I claim as new and desire to secure by Letters Patent:

1. The combination of a set of pointing, cutting, feeding and heading devices, together with an intermittently-traveling die-clamp for holding nail-blanks, and adapted to receive the nail-blank from the feed-guide, carry it in front of the heading device, to hold it in fixed position, as heading-dies, during the heading operation, and after the head is made, carry the nail to the position for its discharge, and means for intermittently operating the said traveling clamp.

2. The combination of a set of pointing, cutting, feeding and heading devices, together with a series of intermittently-traveling die-clamps for holding nail-blanks, each die-clamp being adapted as it is placed opposite the feed-guide, to receive a pointed nail-blank and subsequently carry said blank in front of the heading device, to hold it in fixed position, as heading-dies, during the heading operation and then carry the nail to the position for its discharge, and means for operating said feeding, pointing and cutting devices, in sequence, substantially as and for the purposes set forth.

3. The combination with a rotary transfer-table carrying die-clamps adapted to receive and transfer nail-blank clamps, of a plurality of sets of cutting, feeding and heading devices arranged around said transfer-table, said feeding and heading devices being arranged to move parallel to the axis of the transfer-table and the said heading devices being arranged symmetrically with respect to said transfer-table and provided with means for operating them intermittently, so as to prevent or neutralize the strains tending to bend or deflect the transfer-table on its axis.

4. The combination of two or more sets of feeding, pointing, cutting, guiding and heading devices with a rotary transfer-table mounted centrally with regard to said sets of devices, and carrying a series of traveling nail-blank clamps, each clamp in the series being adapted to receive a nail-blank from each one of the series of feeding-guides and carry it